Patented Aug. 20, 1935

2,011,706

UNITED STATES PATENT OFFICE 2,011,706

ARC WELDING ELECTRODE

Harry S. Blumberg, New York, N. Y., assignor to M. W. Kellogg Company, New York, N. Y., a corporation of Delaware No Drawing. Application February 20, 1934, Serial No. 712,255

7 Claims. (Cl. 219—8)

This invention relates to electric arc welding and in particular to electric arc welding electrodes.

Chrome alloy steel, such as 4–6% chrome-steel and 18% chrome 8% nickel-steel, because of their corrosion-resisting properties have come into favor as base metal for articles which in use are subjected to corrosive conditions. However, the use of chrome alloy steels, as base metal for arc welded articles has not been as extensive as their corrosion-resisting properties would seem to warrant. This is primarily due to the difficulties attendant the production of satisfactory arc welded products.

It was soon realized that chrome alloy steels are not fully satisfactory electric arc welding electrode material. When electric arc welding electrodes are made of chrome steel, taking 4–6% chrome-steel as typical, the deposited weld metal air hardens upon cooling so that serious cracks generally develop in and along the weld. It is also extremely difficult to deposit sufficiently dense weld metal with chrome steel electric arc welding electrodes. When electric arc welding electrodes are made of chrome nickel steel, taking 18% chrome 8% nickel-steel as typical, the deposited weld metal is generally sufficiently dense and does not air harden. However, chrome nickel-steel weld metal because of the chromium carbide precipitation that takes place is subject to intergranular corrosion which may seriously lower its corrosion-resisting properties.

The undesirable properties and characteristics, above mentioned, of the chrome steel and chrome nickel-steel weld metals are due to the fact that the carbon of the weld metals unites with an equivalent of the chromium of the weld metal to form chromium carbide. It has been found that if the formation of chromium carbide is prevented the weld metal will be substantially the equivalent of the base metal. Since titanium has a greater affinity for carbon than chromium and if present in sufficient quantities will prevent the formation of chromium carbide by itself combining with the carbon present, it has been proposed to produce stabilized welding electrode material by adding to the chrome alloy steels an amount of titanium metal related to the carbon content of the steel.

Welding electrodes of titanium bearing chrome alloy-steels have been used but the metal deposited thereby in commercial operations has seldom been found to be any better than that deposited by chrome alloy-steel welding electrodes that do not contain titanium. This it has been found is due to the fact that the titanium, since it has a strong affinity for oxygen, is substantially completely oxidized during the deposition and does not appear in the deposited metal.

It is an object of this invention to provide a chrome alloy-steel electric arc welding electrode, from which stabilized weld metal may be deposited, that has corrosion resisting properties and hardening characteristics comparable to that of the chrome alloy-steel base metal.

It is also an object of this invention to provide an electric arc welding electrode having a chrome alloy-steel core and a protective covering therefor which includes as a constituent thereof a compound or compounds of columbium in quantity related to the carbon content of the deposited weld metal, said compounds being capable of being converted at the arc into metallic columbium and as such alloying with the deposited chrome alloy steel to produce stabilized weld metal.

The further objects and advantages of my invention will be apparent from a consideration of the following description of a preferred embodiment thereof.

In accordance with my invention the chrome alloy steel plate which is to be the base metal of the desired article is cut to size and then worked upon in the usual manner to form the component parts of the desired article. After the component parts are formed as required they are assembled for welding with their edges to be joined in the proper relation. The edges to be joined may be shaped, by machining, pressing, burning and the like, into the welding grooves either immediately after the plate is cut or just prior to the assembly of the parts.

The component parts are then united to form the desired article by depositing fusing weld metal in the welding grooves by means of an electric arc struck between the base metal of the grooves and a destructible covered electric arc welding electrode.

The metallic core of the electric arc welding electrode is preferably of the same composition as the chrome alloy steel of the base metal, that is, if the base metal is of 4–6% chrome steel the electric arc welding electrode core is also of 4–6% chrome steel and if the base metal is of 18% chrome 8% nickel steel the electric arc welding eelctrode core is also of 18% chrome 8% nickel steel. However, if desired, the chrome alloy steel of the electric arc welding electrode core may be of different composition from that of the base metal, for instance, the electric arc welding electrode core may be of 18% chrome 8% nickel steel and the base metal may be of 4-6% chrome steel.

The protective covering of the electric arc welding electrode is made up of any of the usual binder, protective gas evolving and slag forming ingredients with a quantity of columbium compound or compounds and an appropriate quantity of reducing materials. The columbium compounds may be any of the commercially available columbium compounds or mixtures thereof as for instance the various columbium oxides, ferro-columbium or other columbium bearing alloys, also certain of compartively pure columbium ores, such as Swedish tantalite and columbite may be used. The columbium compounds should be present in the protective covering in such quantity that the columbium contained in the deposited weld metal is at least sufficient to combine with substantially all of the carbon present in the deposited weld metal. At present I prefer to use a quantity of columbium compound or compounds giving from six to ten times as much columbium in the deposited weld metal as the latter has carbon. The carbon content of the welding electrode core is a satisfactory criterion for determining the quantity of columbium compound, or compounds, that must be added to the protective covering when the welding electrode core and the base metal are of the same composition. When the welding electrode core and the base metal are of different compositions the carbon content of the deposited weld metal is the only satisfactory criterion.

At present I prefer ferro-manganese and ferro-silicon as reducing materials, although other reducing agents such as ferro-zirconium or ferro-vanadium may be used. The quantity of these latter compounds used in the protective coating depends on the nature of the columbium compound or compounds used and is best arrived at by experimentation, in any event enough should be used to assure reduction of substantially all of the columbium to the metal in the welding arc. Thus as the electric arc welding electrode is consumed by the welding arc metallic columbium is caused to pass with the metal of the core to the molten pool of the weld to stabilize the weld metal.

Relatively little difficulty is experienced in getting the desired amount of columbium into the weld metal as columbium is only slightly oxidizable and readily combines with the carbon of the weld metal.

The stabilized weld metal has substantially the same physical and metallurgical characteristics as the base metal, it does not appreciably air harden and is not susceptible to intergranular corrosion.

The welding electrode, as described above, contains a sufficient quantity of available columbium to assure the stabilization of the weld metal when the welding is carried out in accordance with the ordinary practice, and the carbon content of the deposited weld metal does not vary greatly from the carbon content of the core of the welding electrode. However, it is possible, by variation of the welding practice especially when the carbon content of the base metal is greater than the carbon content of the core of the welding electrode, to deposit a weld metal having a carbon content in excess of the carbon content of the metallic core of the welding electrode. In such case the novel results of this invention are obtained by increasing the columbium content of the covering of the welding electrode as required to assure the stabilization of the weld metal. Also, by variation of the welding practice it is possible to deposit a weld metal whose carbon content is substantially less than that of the metallic core of the welding electrode. In the latter case, the columbium content of the covering of the welding electrode may be reduced proportionately. This however, is not absolutely necessary as small amounts of free columbium do not appreciably alter the characteristics of the weld metal.

4-6% chrome and 18% chrome 8% nickel steel are well known as such in the art. 4-6% chrome steel usually contains from 4-6% chromium, 0.10-0.23% of carbon and the remainder, exclusive of incidental impurities, iron. 18% chrome 8% nickel steel usually contains 18% chromium and 8% nickel, 0.03-0.20% carbon and the remainder, exclusive of incidental impurities, iron.

While I have described a particular embodiment of my invention for the purposes of illustration it shall be understood that various modifications and adaptations thereof may be made within the spirit of the invention as set forth in the appended claims.

I claim:

1. An electric arc welding electrode having a chrome alloy steel core and a protecting covering therefor, said covering including as a constituent thereof a quantity of columbium sufficient to combine with substantially all of the carbon of said core.

2. An electric arc welding electrode adapted for use in the electric arc welding of chrome alloy steel articles, said electrode having a chrome alloy steel core and a protective covering therefor, said covering including as a constituent thereof a quantity of a reducible columbium compound sufficient to combine with substantially all of the carbon in the weld metal deposited during the electric arc welding.

3. An electric arc welding electrode adapted for use in the electric arc welding of chrome alloy steel articles, said electrode having a chrome alloy steel core and a protective covering therefor, said covering including as constituents thereof a quantity of a reducible columbium compound containing sufficient columbium to combine with substantially all of the carbon in the weld metal deposited during the electric arc welding and reducing agents in sufficient quantities to assure reduction of substantially all of the columbium in the welding arc.

4. An electric arc welding electrode having a chrome alloy steel core and a protective covering therefor, said covering including as a constituent thereof a quantity of columbium oxide, said quantity of columbium oxide containing sufficient columbium to combine with substantially all of the carbon in said core.

5. An electric arc welding electrode adapted for use in the electric arc welding of chrome alloy steel articles, said electrode having a chrome alloy steel core and a protective covering therefor, said covering including as a constituent thereof a quantity of columbium oxide having from six to ten times as much columbium as the weld metal deposited during the welding has carbon.

6. In electric arc welding electrode adapted for use in the electric arc welding of chrome alloy steel articles, said electrode having a chrome alloy steel core and a protective covering therefor, said covering including as constituents thereof a quantity of columbium oxide containing sufficient columbium to combine with substantially all of the carbon in the weld metal deposited during the electric arc welding and quantities of ferro-manganese and ferro-silicon sufficient to assure the reduction of substantially all of the columbium in the welding arc.

7. An electric arc welding electrode adapted for use in the electric arc welding of chrome alloy steel articles, said electrode having a chrome alloy steel core and a protective covering therefor, said covering including as constituents thereof a quantity of columbium oxide having from six to ten times as much columbium as the weld metal deposited during the welding has carbon and quantities of ferro-manganese and ferro-silicon sufficient to assure the reduction of substantially all of the columbium in the welding arc.

HARRY S. BLUMBERG.